United States Patent
Roekens

(10) Patent No.: US 6,779,223 B1
(45) Date of Patent: Aug. 24, 2004

(54) CONNECTING PIECE FOR CONNECTING A WIPER BLADE WITH A WIPER ARM

(75) Inventor: Jurgen Roekens, Steenokkerseel (BE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 10/070,114

(22) PCT Filed: Aug. 8, 2000

(86) PCT No.: PCT/DE00/02637

§ 371 (c)(1),
(2), (4) Date: Jun. 11, 2002

(87) PCT Pub. No.: WO01/15946

PCT Pub. Date: Mar. 8, 2001

(30) Foreign Application Priority Data

Aug. 31, 1999 (DE) ........................................ 199 41 459

(51) Int. Cl.⁷ ................................................ B60S 1/40
(52) U.S. Cl. ............................ 15/250.32; 15/250.351; 403/3; 403/321
(58) Field of Search ...................... 15/250.32, 250.31, 15/250.44, 250.43, 250.351, 250.33; 403/3, 4, 321

(56) References Cited

U.S. PATENT DOCUMENTS

| | | | | |
|---|---|---|---|---|
| 3,576,044 A | * | 4/1971 | Besnard | 15/250.32 |
| 4,179,766 A | * | 12/1979 | Weiler et al. | 15/250.32 |
| 5,392,487 A | * | 2/1995 | Yang | 15/250.32 |
| 5,611,103 A | | 3/1997 | Lee | 15/250.32 |
| 5,807,016 A | * | 9/1998 | Herring et al. | 403/321 |

FOREIGN PATENT DOCUMENTS

| | | |
|---|---|---|
| DE | 196 18 307 | 11/1997 |
| EP | 0 585 811 | 3/1994 |
| EP | 0 694 459 | 1/1996 |
| EP | 0 863 058 | 9/1998 |
| FR | 2 190 078 | 1/1974 |
| FR | 2 744 082 | 8/1997 |
| FR | 2 759 047 | 8/1998 |

* cited by examiner

Primary Examiner—Gary K. Graham
(74) Attorney, Agent, or Firm—Kenyon & Kenyon

(57) ABSTRACT

A connecting piece for connecting a wiper arm with a wiper blade, having three different fastening systems for wiper arms, so that a multiplicity of wiper arms can be received.

14 Claims, 5 Drawing Sheets

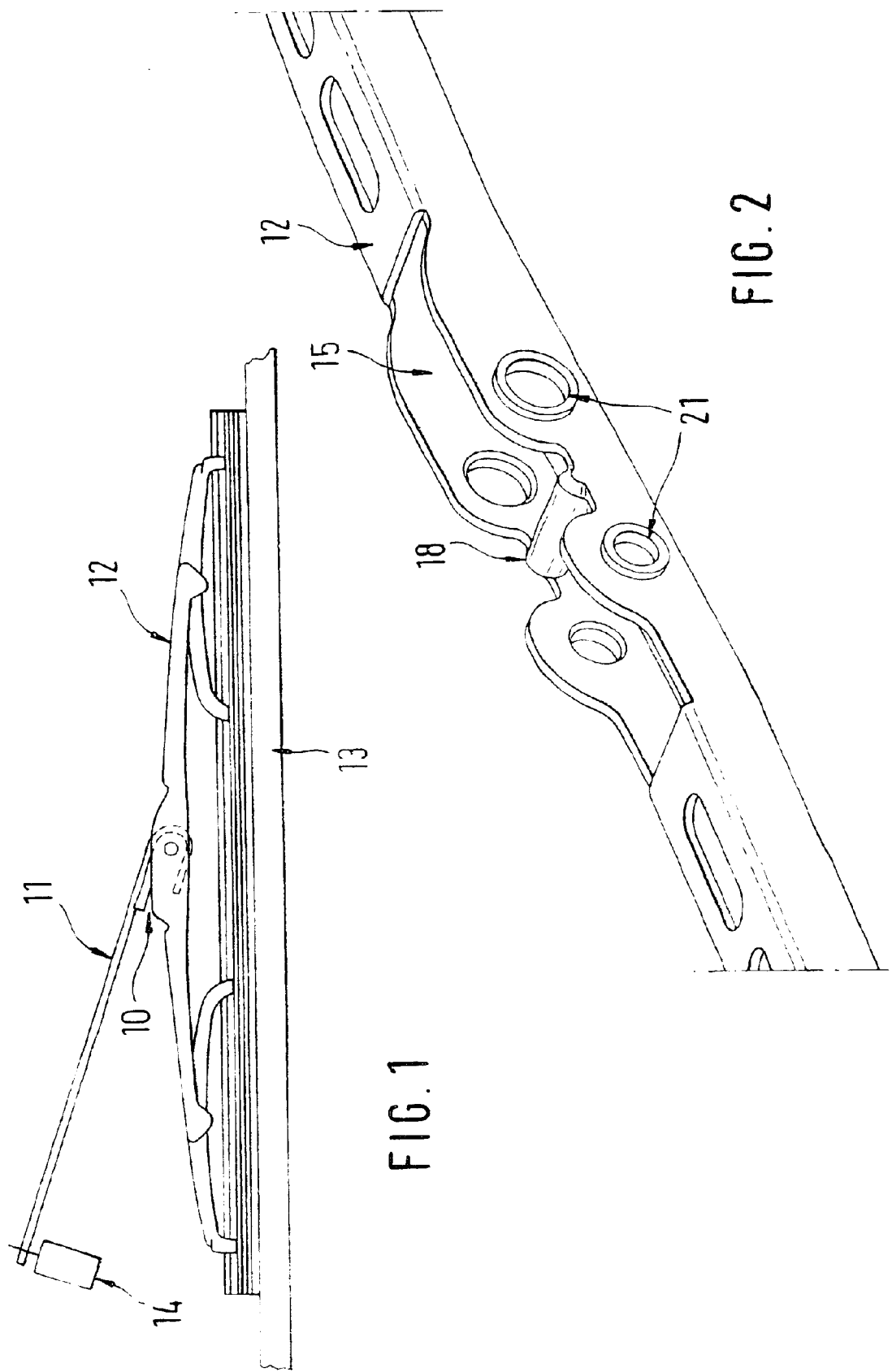

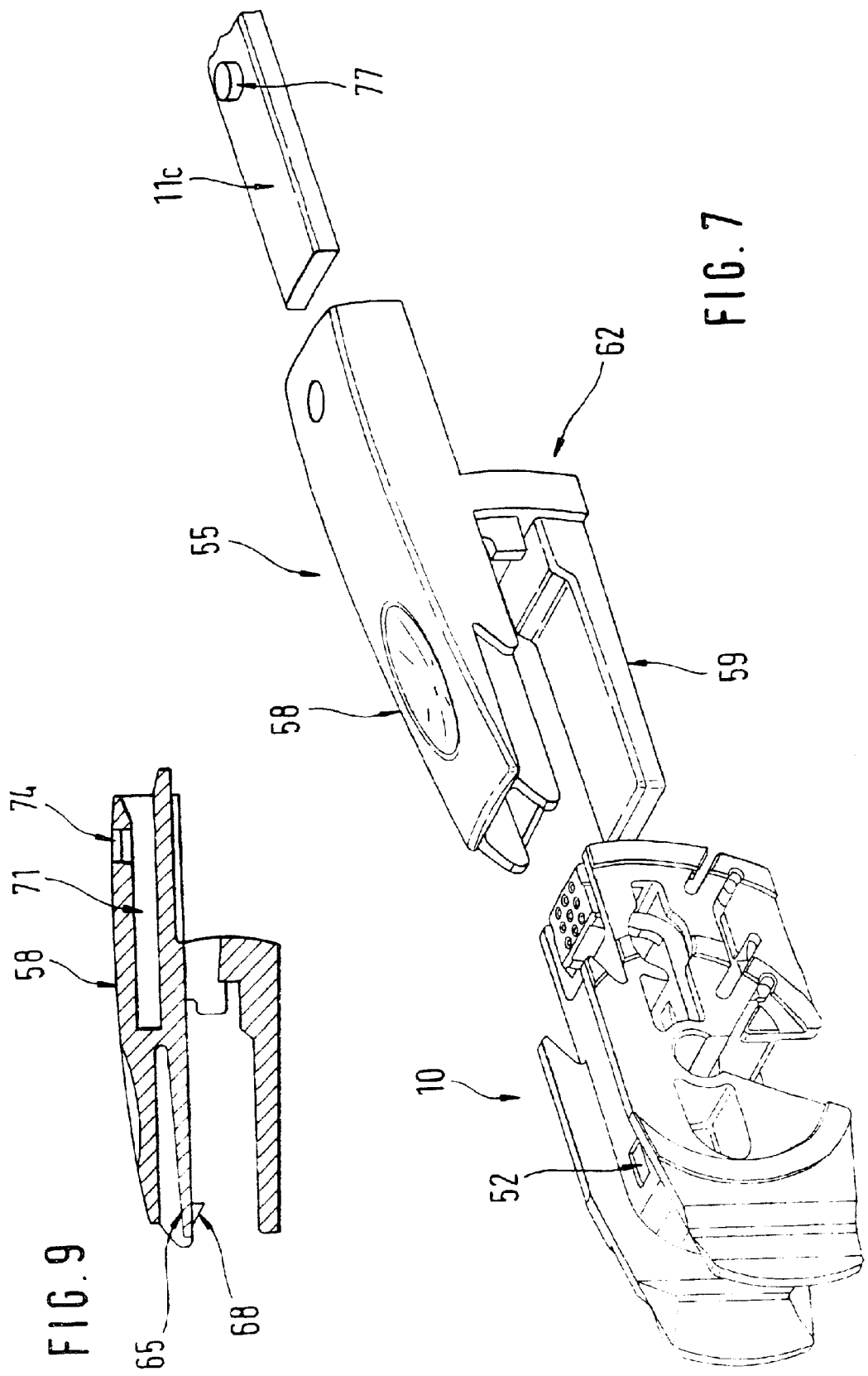

US 6,779,223 B1

CONNECTING PIECE FOR CONNECTING A WIPER BLADE WITH A WIPER ARM

BACKGROUND INFORMATION

Connecting pieces for connecting the wiper arm with the wiper blade are already known, for example from European Patent No. 0 863 058; however, the connecting piece presented there has a multipart construction, so that different adapter parts are used, partly according to the modular design system, for different wiper arms.

SUMMARY OF THE INVENTION

The connecting piece according to the present invention has the advantage that it can receive (accept) a multiplicity of standard types of wiper arm ends, and thus can also be used with a multiplicity of differently dimensioned wiper arms. In addition, it can be manufactured in one piece, for example, in an injection molding method, which results in a significant advantage during installation (assembly), because it is not necessary first to determine which adapter piece fits the wiper arm end in question. This is especially important in particular because, as a rule, the installation is carried out by the vehicle driver himself, i.e., by a layman, not an expert.

Due to the fact that the wiper arm end is constructed in the shape of a fork, there results a high degree of rigidity of the connection between wiper arm and wiper blade. In this way, the optimal angle between windshield and wiper blade can be precisely maintained.

A fitting adapter piece having a fork-shaped construction can also connect the connecting piece with a strip-shaped wiper arm end, as is standard for some wiper arms, without loss of rigidity.

If a region of the connecting piece is constructed as a flexible plateau an especially high dimensional tolerance is achieved. If the flexibility of the plateau is due to crosspieces that have an angle to the wiper arm of less than 90°, then when the connecting piece is removed from the wiper arm there results a self-arresting effect that further increases the strength of the connection between wiper arm and wiper blade.

Due to the fact that the flexible regions have stops for limiting the flexibility, a high degree of resistance to breaking is also ensured.

Through the clamp-type projections for arresting the wiper arms, a multiplicity of different wiper arms can be fastened securely to the wiper blade, since it is not necessary to use the arresting method used by the manufacturer of the wiper arm.

BRIEF DESCRIPTION OF THE DRAWINGS

FIG. 1 shows a schematic view of a part of a wiper apparatus having the inventive connecting piece, in the installed position.

FIG. 2 shows a box region of a center bracket of a wiper blade.

FIG. 7 shows a connecting piece according to the present invention having a strip-type wiper arm end and a fork-shaped adapter, in a perspective view.

FIG. 9 shows a section through an adapter.

DETAILED DESCRIPTION

Figure 3:
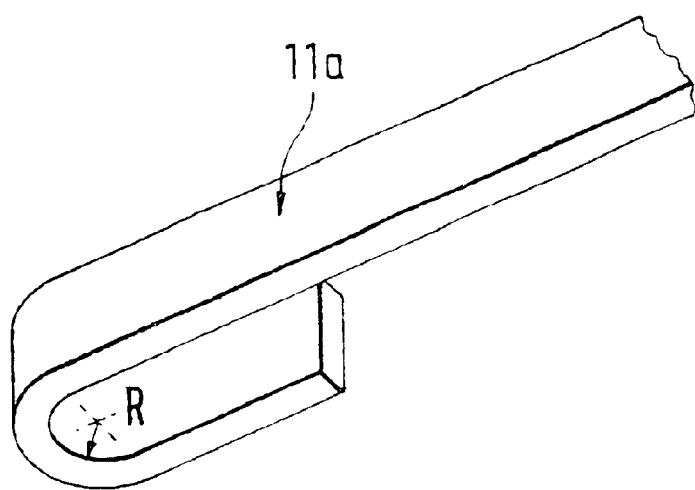
FIG. 3 shows a hook-shaped wiper arm end.

In FIG. 1, a connecting piece 10 having a wiper arm 11 and a wiper blade 12 can be seen. In the installed position, the wiper blade lies on a windshield 13. Wiper arm 11 has two ends, its lower end being connected with a wiper motor 14. Its upper end standardly has either a hook-type wiper arm end (11a), a pin-type wiper arm end (11b), or a strip-type wiper arm end (11c).

In FIG. 2, a box region 15 of a center bracket of a wiper blade 12 is shown. In this region there is located a connecting element 18, often a rivet or a roll rivet, that connects the body of connecting piece 10 with wiper blade 12. At the sides, box region 15 has various bored holes 21 that may have a border.

FIG. 3 shows a hook-shaped wiper arm end. It has a hook-shaped 180° bend having radius R.

Figure 4:
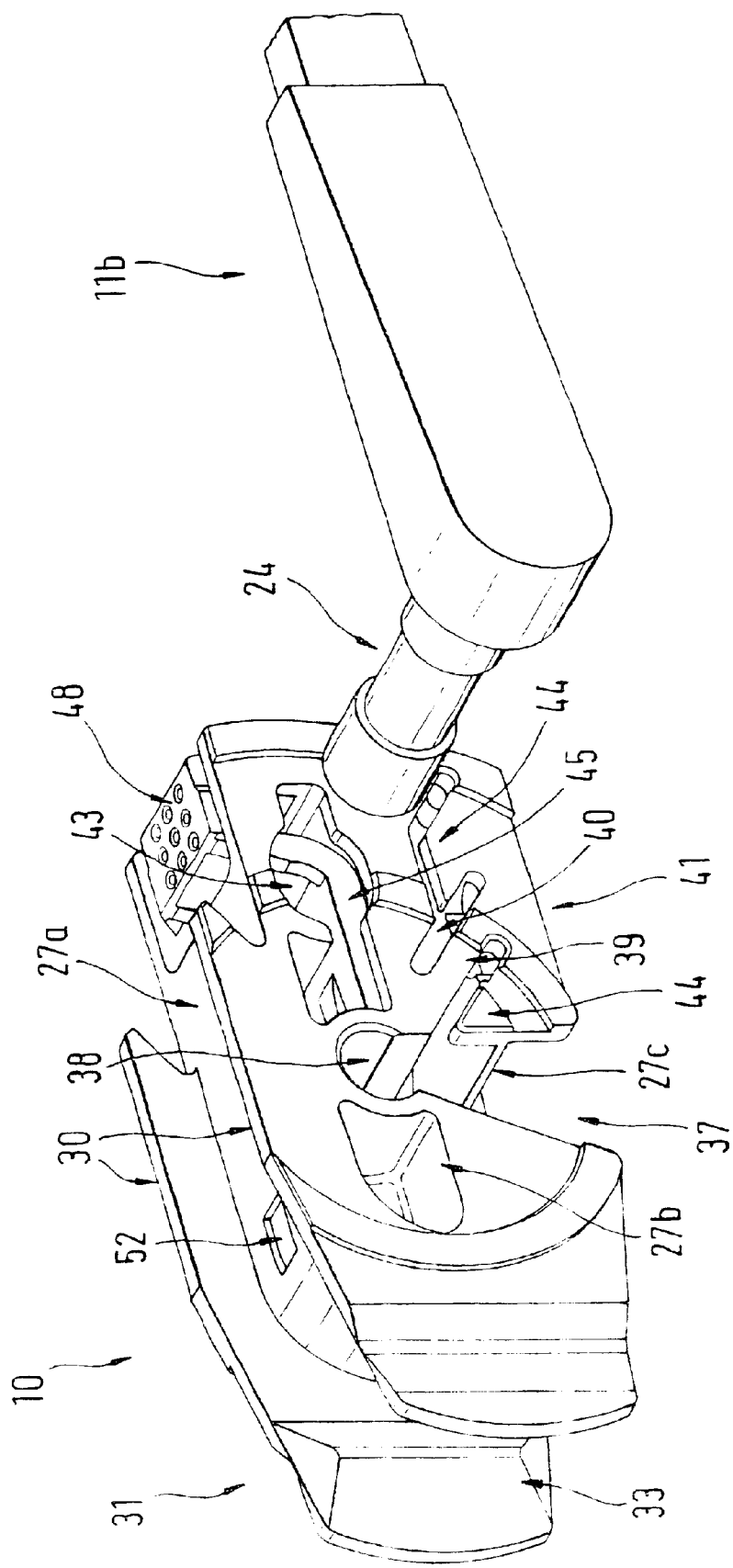
FIG. 4 shows a connecting piece according to the present invention and a pin-arm wiper arm end, in a perspective view.

FIG. 4 shows an inventive connecting piece 10 and a pin-type wiper arm end 11b. Pin-type wiper arm end 11b has a pin 24 that in the installed position lies parallel to the windshield and perpendicular to wiper arm 11, and whose diameter is diminished in a suitable segment.

Figure 8:
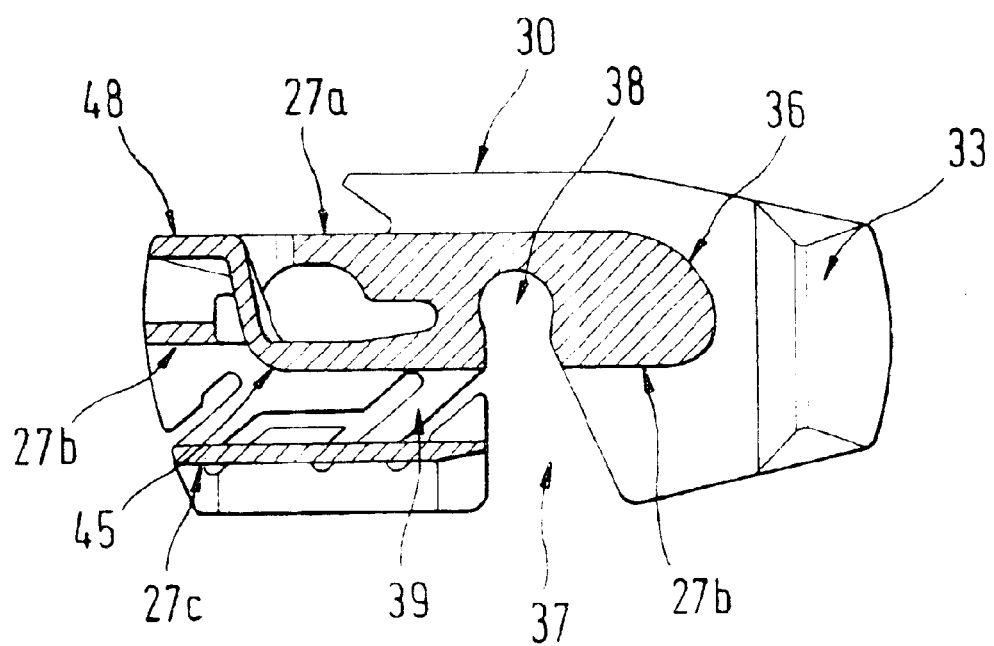
FIG. 8 shows a section through an inventive connecting piece.

The body of connecting piece 10 essentially has two side walls 30 that are held by three cross-connecting pieces 27a, 27b, and 27c, and that receive and support wiper blade 12 (see also FIG. 8).

On the front side, facing away from wiper arm 11, of the connecting piece, side walls 30 extend beyond cross-connecting pieces 27a, b, c, and are terminated by raised parts 33 This results in a clamp-type projection 31 that is used to arrest hook-type wiper arm ends 11a.

Upper surface 27a is curved downward in the front region of the body, forming a radius 36.

On its lower side, which in the installed state faces the windshield, the connecting piece has a transverse groove 37 that tapers upward and that terminates with a cylindrical opening 38 that receives connecting element 18 of wiper blade 12.

In the rear region, facing the wiper arm, connection piece 10 has, on its side facing windshield 13, slots 40 in lateral walls 30, so that lower surface 27b is supported only by thin crosspieces 39, and thus forms a flexible plateau.

The direction of slots 40, and thus the direction of crosspieces 39, is usefully selected such that when connecting piece 10 is removed from wiper arm 11a, the adhesion of wiper arm 11a to lower surface 27c effects an increase of the contact pressure of lower surface 27c on wiper arm 11a. This is achieved in that when connecting piece 10 is withdrawn from wiper arm 11a, the lowest surface 27c is moved slightly forward through its adhesion to wiper arm 11a. The angle of crosspieces 39 to the wiper arm, and thus the distance between upper surface 27a and lower surface 27c, is increased slightly by this, increasing the contact pressure of surface 27c against the bent over end of wiper arm 11a.

In order to limit flexibility, flexible region 41 has stops 44 that prevent crosspieces 39 from breaking off.

Above plateau 27c, connecting piece 10 has a hole 43 that extends through it transversely between the upper surface and the center surface. This hole 43 receives a pin-arm wiper arm 11b.

For this purpose, center surface 27b is interrupted by a tongue-type clip 45 that extends from transverse groove 37 to behind hole 43, and that reduces the diameter of hole 43 inside the body of connecting piece 10. Clip 45 is bent upward behind hole 43, and subsequently has a pressure surface 48 that runs in parallel alignment to upper surface 27a.

If pin 24 of a pin-type wiper arm end 11b is now introduced into opening 43, clip 45 is first bent downward so that it will then snap upward, due to the diminished diameter, when pin 24 is located in the desired position, thus snapping wiper arm 11 into place.

On the upper surface, the connecting piece has two openings 52 that can be used to fasten an adapter 55.

Figure 5:
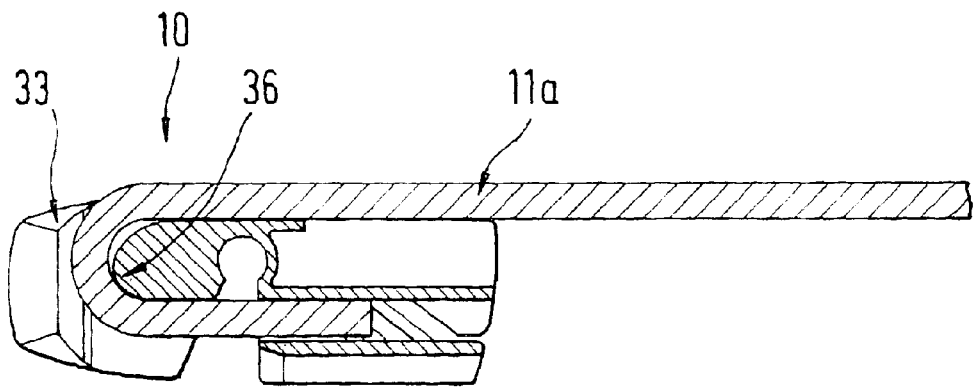
FIGS. 5 and 6 show a connecting piece according to the present invention, each having a hook-shaped wiper arm end.

In FIG. 5, a connecting piece 10 having a hook-type wiper arm end 11a is shown in the installed position.

Figure 6:
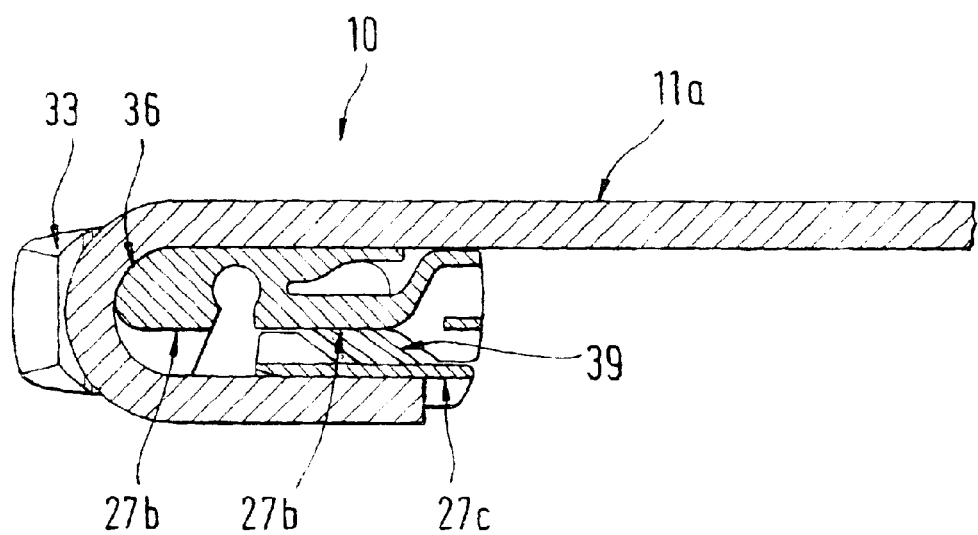

FIG. 6 likewise shows a connecting piece 10 according to the present invention having a wiper arm 11a, but here wiper arm 11a has a larger radius R than in FIG. 5. For this reason, the bent-off end slides under flexible plateau 27c, and presses this plateau slightly upward if necessary. Here the arresting via raised parts 33 of connecting piece 10 can be seen clearly.

FIG. 7 shows a connecting piece 10 according to the present invention together with an adapter 55 and a strip-type wiper arm end 11c. Adapter 55 essentially has a long and a short longitudinal brace 58, 59, connected with one another by a transverse brace 62 in such a way that a fork-type structure results.

FIG. 9 shows adapter part 55 in a sectional view. The long upper longitudinal brace 58 has on its lower side, in the front region facing connecting piece 10, an arresting tongue 65 to whose end teeth 68 are attached that arrest adapter 55 in openings 52 of connecting piece 10. On the side of adapter 55 facing wiper arm 11, there is located an arm receptacle 71 made up of an opening and an arrest hole 74. Arm receptacle 71 is fashioned in such a way that a strip-shaped wiper arm 11c can be inserted and is arrested via a wiper arm peg 77 (tab) that snaps into arrest hole 74.

In the connection of adapter 55 with connecting piece 10, short longitudinal brace 59 is inserted into the area between center and lower surfaces 27b and c. Long longitudinal brace 58, having arrest tongue 65, of adapter 55 slides forward on upper surface 27a of connecting piece 10. In the snapped-in state, teeth 68 engage in openings 52.

It is also possible to attach an arrest pin to the lower side of short longitudinal brace 59; in the snapped-in state this bolt snaps into a hole located in the flexible plateau, i.e., surface 27c.

What is claimed is:

1. A connecting piece for connecting a wiper blade with a wiper arm, comprising:
   a body adapted to be connected with a wiper arm end;
   means for receiving and supporting the wiper blade;
   means for receiving a hook-shaped wiper arm end;
   means for receiving a pin-type wiper arm end; and
   at least one additional means for receiving another type of wiper arm end;
   wherein the another type of wiper arm end is in the shape of a fork.

2. The connecting piece according to claim 1, further comprising a flexible region that is fashioned as a plateau.

3. The connecting piece according to claim 2, wherein the means for receiving and supporting the wiper blade have slots, in such a way that a springy cross sectional structure arises that is formed by at least one crosspiece.

4. The connecting piece according to claim 3, wherein the plateau lies in a plane to which the at least one crosspiece has an angle of less than 90°.

5. The connecting piece according to claim 1, further comprising at least one flexible region having stops for limiting flexibility.

6. The connecting piece according to claim 1, wherein the means for receiving and supporting the wiper blade has a hole that extends through it in a transverse fashion, and further comprising an elastic clip situated in an opening formed by the hole.

7. The connecting piece according to claim 1, wherein the body has at least one clamp-type projection for arresting a wiper arm end.

8. A connecting piece for connecting a wiper blade with a wiper arm, comprising:
   a body adapted to be connected with a wiper arm end;
   means for receiving and supporting the wiper blade;
   means for receiving a hook-shaped wiper arm end;
   means for receiving a pin-type wiper arm end; and
   at least one additional means for receiving another type of wiper arm end;
   wherein the another type of wiper arm end is a strip-shaped wiper arm end having pegs in connection with a fork-shaped adapter that faces the connecting piece.

9. The connecting piece according to claim 8, further comprising a flexible region that is fashioned as a plateau.

10. The connecting piece according to claim 9, wherein the means for receiving and supporting the wiper blade have slots, in such a way that a springy cross sectional structure arises that is formed by at least one crosspiece.

11. The connecting piece according to claim 10, wherein the plateau lies in a plane to which the at least one crosspiece has an angle of less than 90°.

12. The connecting piece according to claim 8, further comprising at least one flexible region having stops for limiting flexibility.

13. The connecting piece according to claim 8, wherein the means for receiving and supporting the wiper blade has a hole that extends through it in a transverse fashion, and further comprising an elastic clip situated in an opening formed by the hole.

14. The connecting piece according to claim 8, wherein the body has at least one clamp-type projection for arresting a wiper arm end.

* * * * *